(12) United States Patent
Aloni et al.

(10) Patent No.: US 8,230,144 B1
(45) Date of Patent: Jul. 24, 2012

(54) HIGH SPEED MULTI-THREADED REDUCED INSTRUCTION SET COMPUTER (RISC) PROCESSOR

(75) Inventors: Eli Aloni, Zur Yigal (IL); Gilad Ayalon, Hod Hasharon (IL); Oren David, Kfar Sava (IL)

(73) Assignee: Broadcom Corporation, Irvine, CA (US)

( * ) Notice: Subject to any disclaimer, the term of this patent is extended or adjusted under 35 U.S.C. 154(b) by 1529 days.

(21) Appl. No.: 11/253,427

(22) Filed: Oct. 18, 2005

Related U.S. Application Data

(60) Provisional application No. 60/620,098, filed on Oct. 19, 2004, provisional application No. 60/626,283, filed on Nov. 8, 2004, provisional application No. 60/643,335, filed on Jan. 11, 2005.

(51) Int. Cl.
*G06F 7/22* (2006.01)
(52) U.S. Cl. .......................................... 710/72; 712/230
(58) Field of Classification Search .................. 712/234, 712/236
See application file for complete search history.

(56) References Cited

U.S. PATENT DOCUMENTS

| | | | |
|---|---|---|---|
| 7,395,355 | B2 | 7/2008 | Afergan et al. |
| 2004/0073703 | A1 | 4/2004 | Boucher et al. |
| 2004/0168030 | A1 | 8/2004 | Traversat et al. |
| 2005/0165985 | A1 | 7/2005 | Vangal et al. |

OTHER PUBLICATIONS

Hennessy et al. Computer Architecture: A Quantitative Approach, 3rd, 2003 p. 345, 608-615, inside book cover.*
Kubota et al. Parallelization of Decision Tree Algorithm and its Performance Evaluation, IEEE, 2000.*
Carribault et al. Branch Strategies to Optimize Decision Trees for Wide-Issue Architectures, Languages and Compilers for High Performance Computing, 17th International Workshop, LCPC 2004, Sep. 2004.*
Hennessy et al. Computer Architecture, 2003, Morgan Kaufmann, 3rd, p. 232.*
Hennessy et al., A Survey of RISC Architectures for Desktop, Server, and Embedded Computers, Computer Architecture: A Quantitative Approach, 2003, Morgan Kaufmann, 3rd, Appendix C, pp. D.1-D.48.*
Agrawal et al., Database Mining: A Performance Perspective, 1993, IEEE, pp. 914-925.*
Cormen et al., Introduction to Algorithms, The MIT Press, 2nd, p. 166.*

* cited by examiner

*Primary Examiner* — Cheng-Yuan Tseng
(74) *Attorney, Agent, or Firm* — Thomas, Kayden, Horstemeyer & Risley LLP.

(57) ABSTRACT

A reduced instruction set computer (RISC) includes at least one arithmetic logic units (ALUs), which are arranged to evaluate logical conditions. A processing pipeline is arranged to solve a decision problem that is representable as a decision tree including at least three nodes by processing a sequence of pipelined instructions that traverse the decision tree. At least some of the pipelined instructions instruct the one or more ALUs to evaluate respective logical conditions, such that the pipeline flushes the instructions from the pipeline no more than once in the course of processing the sequence regardless of whether the logical conditions evaluate to true or false.

6 Claims, 8 Drawing Sheets

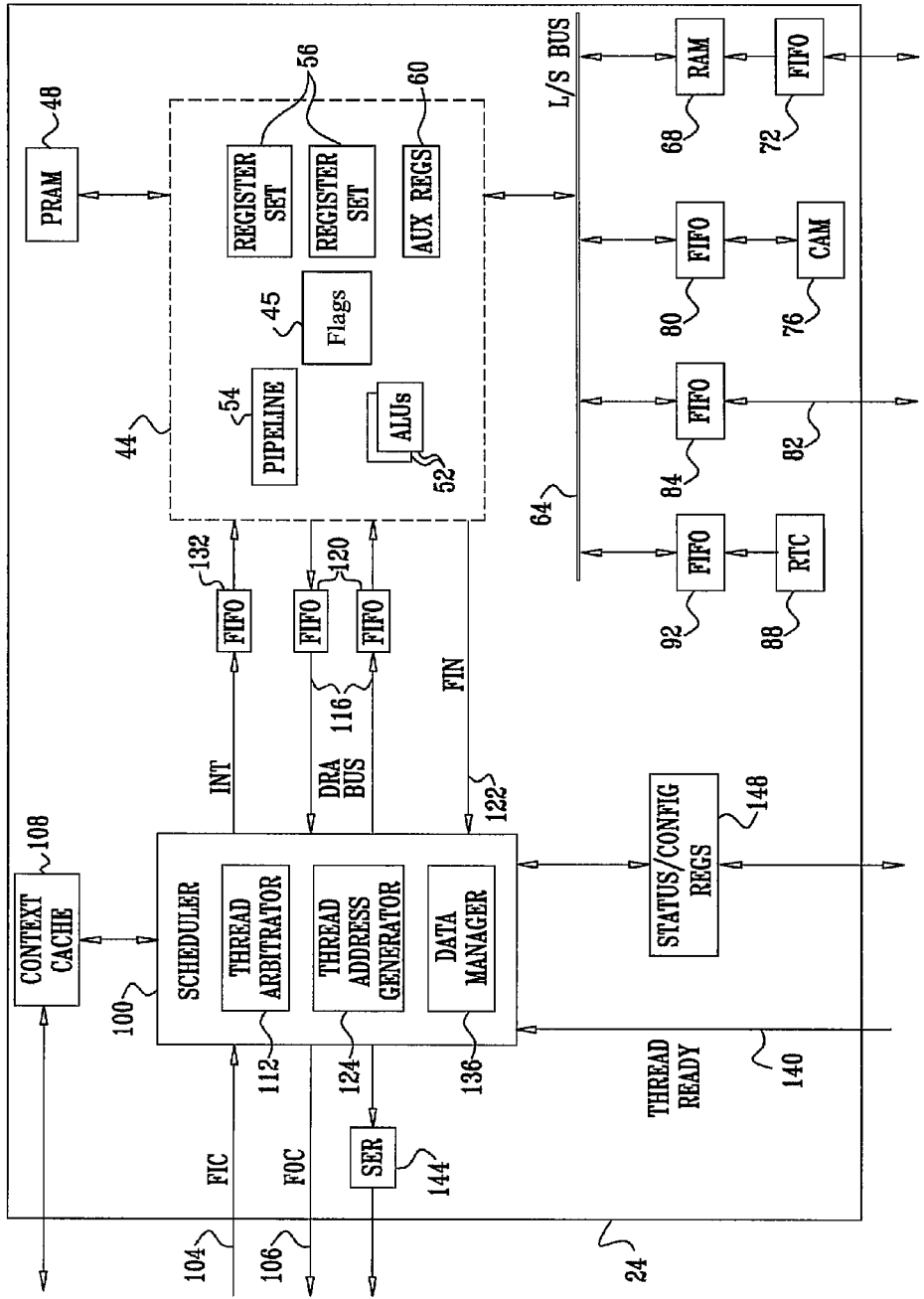
FIG. 2
FIG. 2 AMENDED

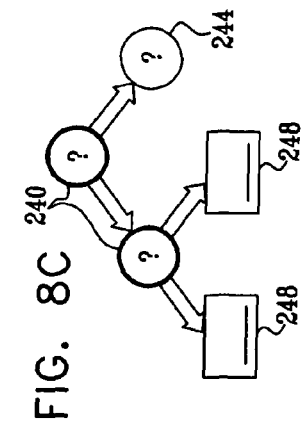
FIG. 8A
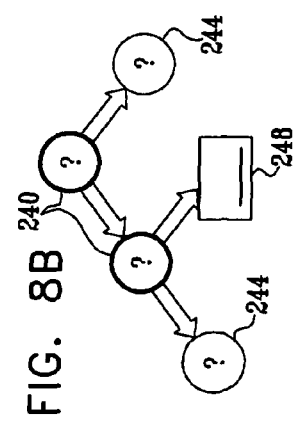
FIG. 8B
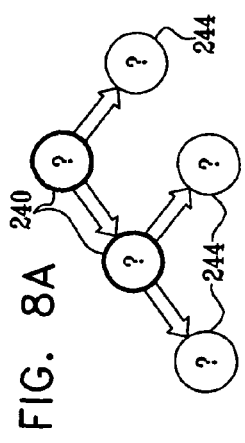
FIG. 8C
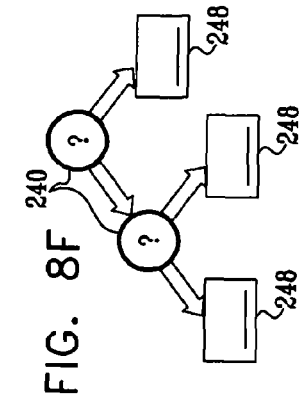
FIG. 8D
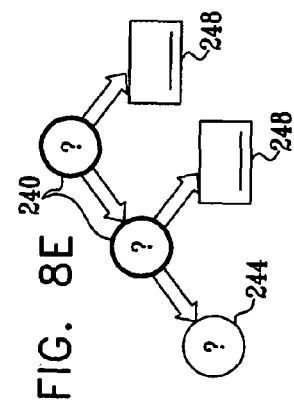
FIG. 8E
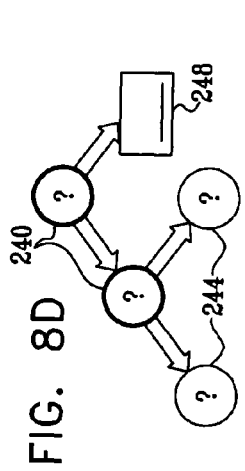
FIG. 8F
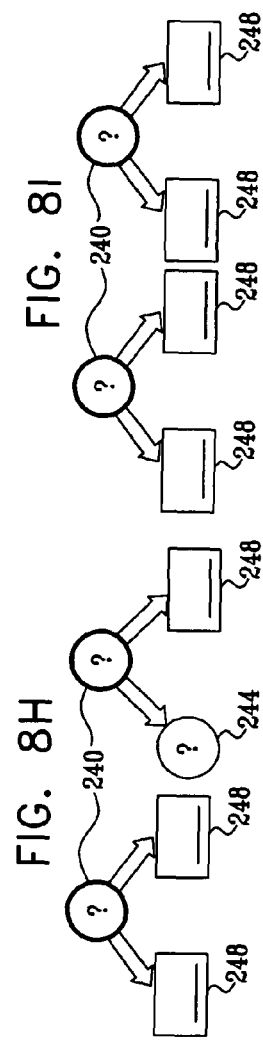
FIG. 8G
FIG. 8H
FIG. 8I
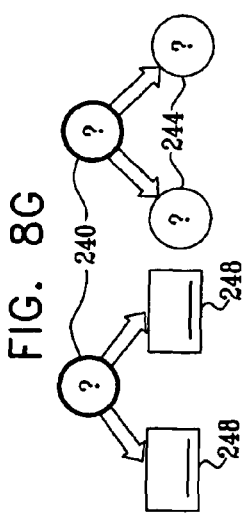

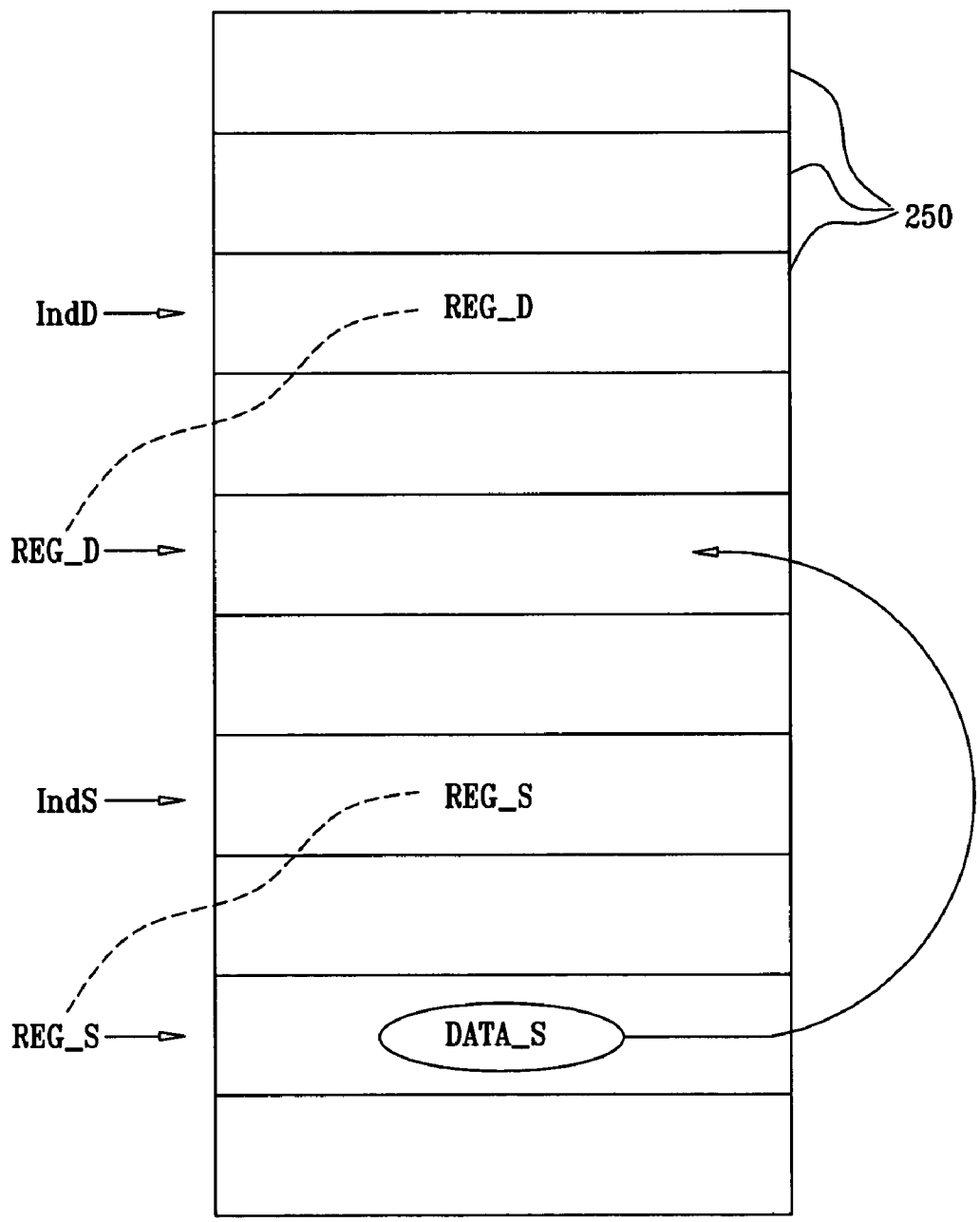

HIGH SPEED MULTI-THREADED REDUCED INSTRUCTION SET COMPUTER (RISC) PROCESSOR

CROSS-REFERENCE TO RELATED APPLICATIONS/INCORPORATION BY REFERENCE

This application makes reference to, claims priority to, and claims the benefit of:
U.S. Provisional Patent Application Ser. No. 60/620,098, filed Oct. 19, 2004;
U.S. Provisional Patent Application Ser. No. 60/626,283, filed Nov. 8, 2004; and
U.S. Provisional Patent Application Ser. No. 60/643,335, filed Jan. 11, 2005.

This application also makes reference to:
U.S. patent application Ser. No. 11/253,216, filed on even date herewith;
U.S. patent application Ser. No. 11/253,394, filed on even date herewith;
U.S. patent application Ser. No. 11/252,922, filed on even date herewith;
U.S. patent application Ser. No. 11/253,245, filed on even date herewith;
U.S. patent application Ser. No. 11/253,397, filed on even date herewith;
U.S. patent application Ser. No. 11/253,097, filed on even date herewith;
U.S. patent application Ser. No. 11/253,215, filed on even date herewith;
U.S. patent application Ser. No. 11/253,509, filed on even date herewith;
U.S. patent application Ser. No. 11/253,433, filed on even date herewith;
U.S. patent application Ser. No. 11/253,429, filed on even date herewith; and
U.S. patent application Ser. No. 11/253,480, filed on even date herewith.

Each of the above stated applications is hereby incorporated herein by reference in its entirety.

FIELD OF THE INVENTION

The present invention relates generally to computer processor architecture, and more specifically to high-speed, multi-threaded reduced instruction set computer (RISC) processors.

BACKGROUND OF THE INVENTION

Reduced instruction set computers (RISCs) are used in a variety of computing applications and may be offered by a number of vendors.

One exemplary application of RISCs is in network interface cards (NICs) that perform protocol processing functions for a host computer. Such NIC devices may relieve the host CPU of processing network layer (Layer 3) protocols, such as the Internet Protocol (IP), and transport layer (Layer 4) protocols, such as the Transport Control Protocol (TCP) and User Datagram Protocol (UDP), as well as protocols in Layers 5 and above.

Further limitations and disadvantages of conventional and traditional approaches will become apparent to one of skill in the art, through comparison of such systems with some aspects of the present invention as set forth in the remainder of the present application with reference to the drawings.

SUMMARY OF THE INVENTION

Not Applicable.

BRIEF DESCRIPTION OF SEVERAL VIEWS OF THE DRAWINGS

FIG. 2 is a block diagram that illustrates of the exemplary RISC of FIG. 1, in accordance with an embodiment of the present invention.

FIGS. 8A-8I are diagrams that illustrate exemplary leaf configurations in a decision tree, in accordance with another embodiment of the present invention; and FIG. 9 is a diagram that demonstrates exemplary use of the movrind command for indirect addressing of registers, in accordance with an embodiment of the present invention.

DETAILED DESCRIPTION OF THE INVENTION

OVERVIEW

Figure 1:
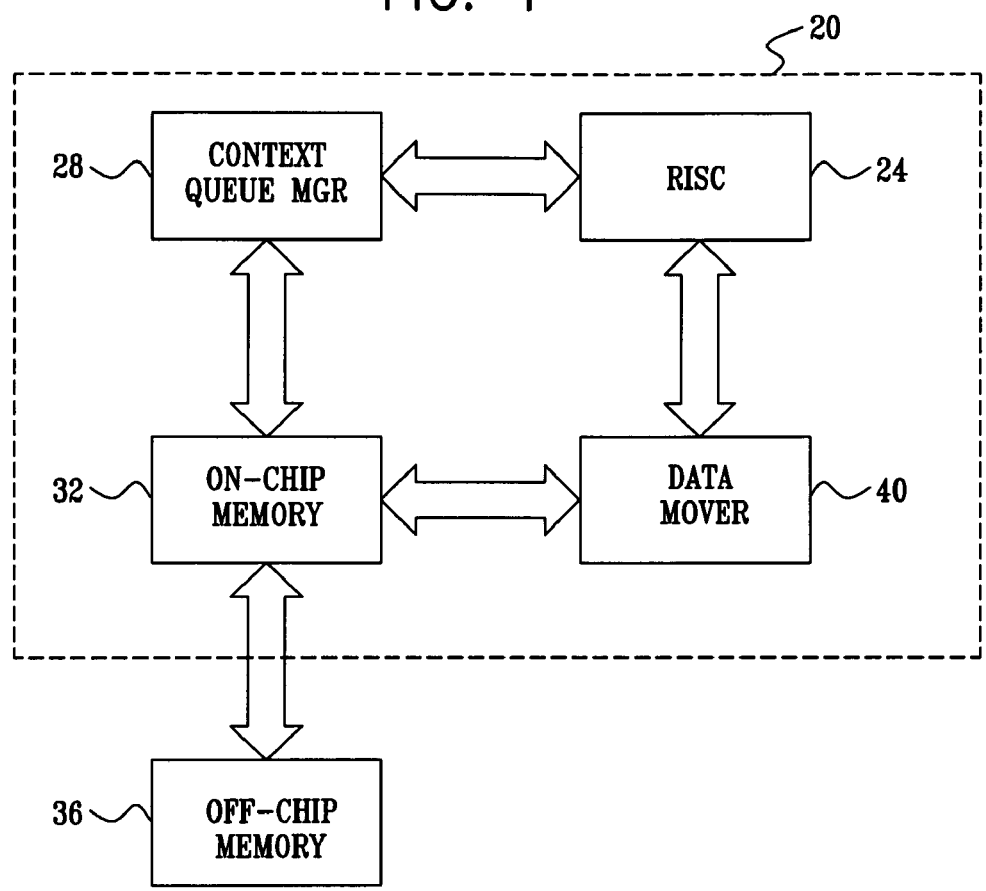
FIG. 1 is a block diagram that illustrates an exemplary embedded system, which may be utilized in accordance with an embodiment of the present invention.

Certain embodiments of the invention may be found in a method and system for a high-speed, multi-threaded reduced instruction set computer (RISC) processor. Various embodiments of a reduced instruction set computer (RISC) may comprise one or more arithmetic logic units (ALUs), which are arranged to evaluate logical conditions. A processing pipeline is arranged to solve a decision problem that is representable as a decision tree including at least three nodes by processing a sequence of pipelined instructions that traverse the decision tree. At least some of the pipelined instructions instruct the one or more ALUs to evaluate respective logical conditions, such that the pipeline flushes the instructions from the pipeline no more than once in the course of processing the sequence regardless of whether the logical conditions evaluate to true or false.

In many computing applications, a computer processes multiple instances, or threads, of a software process. The threads are typically sliced into smaller processing sequences that are scheduled and processed in alternation by the computer. The alternation between the different threads is commonly referred to as "context switching." In such multi-thread applications, it is highly desirable to increase the computer's processing efficiency by reducing the overhead time and processing resources wasted due to context switching and other management tasks.

Embodiments of the present invention provide improved methods and RISC architectures, which are particularly suitable for performing multi-thread applications. The RISC configurations described herein comprise a processing core that alternately processes multiple software threads. Each thread is defined by state information, referred to as the context of the thread. The RISC comprises a hardware-implemented scheduler that schedules the different threads to be processed by the core and performs additional management tasks. The hardware-implemented scheduler performs these tasks without using the core's processing resources.

Typically, the RISC comprises two register sets. The context of the currently-processed thread is stored in one of these register sets, and the core processes the thread using this context. In parallel, the scheduler selects the next thread to be processed and writes its context to the second register set. When the processing of the current thread is completed, the context of the next thread is already available to the RISC. Using the dual register sets thus reduces the time, latency and processing resources dedicated to context switching and improves the RISC processing efficiency.

In some embodiments, the scheduler maintains a list of threads that are ready to be processed, and selects the next thread out of this list. The processing of threads that are not ready, such as threads waiting for data to be fetched from an external source, is deferred until they are ready. This mechanism is particularly suitable for increasing the efficiency of I/O-intensive applications, in which the processing of threads frequently requires the use of externally-stored information.

Some multi-thread applications involve intensive handling of decision trees, and in particular decision trees that represent state machines. In some embodiments, the instruction set of the RISC comprises commands that are particularly suitable for efficient processing of computing tasks modeled as decision trees. Other commands useful in multi-thread applications, such as indirect addressing of registers, are also described herein.

An exemplary multi-thread, I/O-intensive application is the processing associated with connection-oriented communication protocols, as performed by RISCs in network interface cards (NICs).

System Description

FIG. 1 is a block diagram that illustrates an exemplary embedded system 20, which may be utilized in accordance with an embodiment of the present invention. System 20 comprises a reduced instruction set computer (RISC) 24. RISC 24 processes multiple threads simultaneously, using an architecture and methods which are described in detail below. Each thread processed by RISC 24 is associated with a context that contains state information pertaining to the thread. In some cases, the state information is represented as a set of values assigned to a respective set of state variables. A context and queue manager 28 provides RISC 24 with contexts of threads to be processed. RISC 24 updates manager 28 with the updated contexts of processed threads.

Data pertaining to the threads being processed may be stored in an on-chip memory 32, internally to embedded system 20. Although the data stored in the on-chip memory is accessible to manager 28 with a relatively short access time, the capacity of memory 32 is typically limited. Therefore, some data may be stored in an off-chip memory 36 external to system 20. Often, the access time for fetching data from off-chip memory 36 is relatively long. In some embodiments, off-chip memory 36 is located in a host computer (not shown). Storing and retrieving data from the off-chip memory often involves communicating over a bus, such as a PCI or PCI-Express bus, which further increases the access time to this data. As will be described below, RISC 24 itself may also comprise an internal cache memory for storing thread contexts.

A data mover 40 provides data stored in the on-chip and/or off-chip memories to RISC 24 and stores data provided by RISC 24 in these memories. Generally, the data handled by data mover 40 may or may not be correlated with specific thread contexts.

The specific configuration and functionality of manager 28 and data mover 40 may vary depending on the application of embedded system 20, and are considered to be outside the scope of the present invention. In some embodiments, system 20 may comprise two or more RISCs 24 as well as additional circuitry (not shown). Other components of system 20 (such as on-chip memory, off-chip memory, thread/queue manager and data mover) may be either common to more than one RISC in the system or dedicated to a single RISC.

In some embodiments, RISC 24 performs protocol processing functions of a connection-oriented protocol, in order to perform protocol acceleration and/or to relieve a host computer (not shown) of performing these tasks. Connection-oriented protocols may comprise, for example, TCP/IP, RDMA, iSCSI, NFS, CIFS, and/or any other such protocol known in the art. Several exemplary methods and systems that use RISCs for connection-oriented protocol processing are described in detail in the related applications cited above. In these embodiments, embedded system 20 comprises one or more RISCs 24, and is part of a network interface card (NIC) connected to the host computer via a host bus. The off-chip memory typically resides in the host computer. In such protocol processing applications, the software threads handled by RISC 24 correspond to connections and/or packets of the connection-oriented protocol. Alternatively, RISC 24 can be used in any other suitable multi-thread application.

FIG. 2 is a block diagram that illustrates the exemplary RISC 24 of FIG. 1, in accordance with an embodiment of the present invention. For simplicity of explanation, a single RISC 24 is shown. The description that follows is applicable, however, to any suitable configuration of system 20 comprising any number of RISCs.

RISC 24 comprises a processing core 44, which runs program code that is stored in a program memory, such as a program random access memory (PRAM) 48. The core 44 comprises an arithmetic logic unit (ALU) 52, or optionally two or more ALUs operating in parallel, thereby enabling the RISC to perform multiple simultaneous arithmetic/logic operations in each clock cycle. The arithmetic/logic operations carried out by ALUs 52 typically comprise binary addition, subtraction, bitwise AND/OR/XOR operations, bitwise comparison and shift/rotate operations. In some embodiments, ALUs 52 operate on 32 bit words.

In some embodiments, the instruction set of RISC 24 comprises a plurality of instructions that perform cyclic redundancy checking (CRC), such as a 32-bit CRC (CRC32) common in networking protocols. The RISC engine may implement any suitable method of CRC computation that is known in the art. Exemplary methods are described in U.S. Patent Application Publications US 2003/0066011 and US 2004/0205441, whose disclosures are incorporated herein by reference.

In some embodiments, RISC 24 has a plurality of clock domains. Core 24 operates at a high clock rate, for example, a clock rate in the range of about 300-500 MHz. Other components of RISC 24 typically operate at a lower clock rate, in the range of about 150-250 MHz, for example. In order to mediate between the clock domains, the core communicates with the other components of RISC 24 via queues or FIFOs, such as FIFOs 72, 80, 84, 92, 120 and 132 shown in the figure. PRAM 48 and RAM 68 typically operate at the high clock rate. In some embodiments, the high clock rate is equal to twice the low clock rate, although any other suitable relationship between the clock rates can be used.

Figure 4:
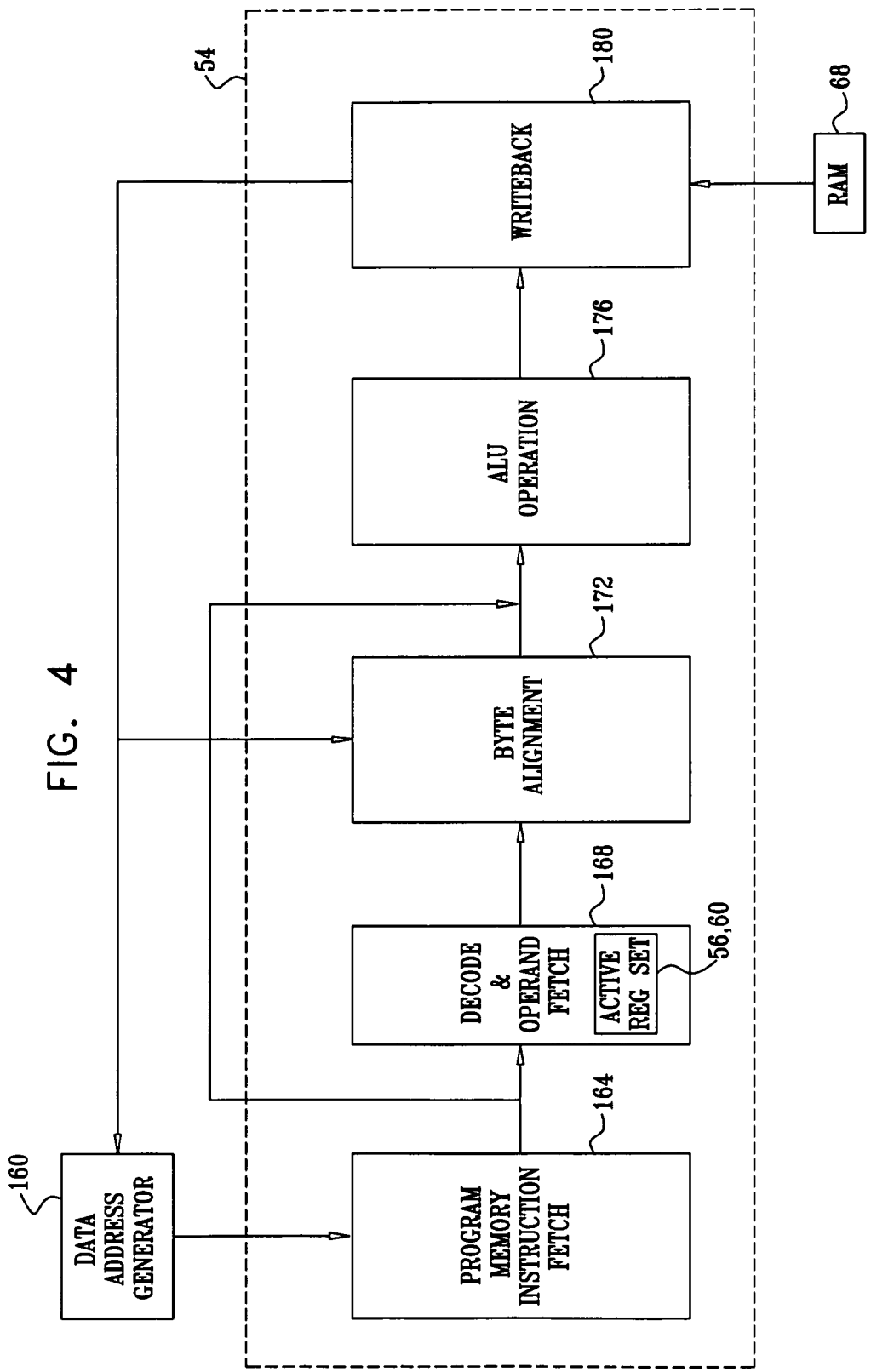
FIG. 4 is a block diagram that illustrates exemplary pipeline stages of pipeline in a core of RISC, in accordance with an embodiment of the present invention.

The instruction set defined for RISC 24 comprises pipelined instructions, with each pipelined instruction broken into a sequence of two or more basic operations. Core 44 comprises a pipeline 54 that carries out the pipelined instructions. Pipeline 54 comprises several cascaded pipeline stages. In each clock cycle, each pipeline stage performs one of the basic operations, which may comprise, for example, fetching data from internal registers or from external memory, decoding program instructions, performing arithmetic/logic operations using ALUs 52, and writing operation results to registers or to external memory. FIG. 4 below shows an exemplary pipeline of RISC 24 comprising five pipeline stages.

In an exemplary embodiment of the invention, the core 44 comprises a plurality of register sets 56, each comprising a plurality of registers. In one embodiment of the invention in which the core comprises two register sets, each register set 56 comprises 112 32-bit registers implemented using a six-port random access memory (RAM). Core 44 alternates between the register sets for increasing the processing efficiency and reducing context-switching overhead when handling multiple threads, as will be described in detail hereinbelow. Core 44 also comprises auxiliary, global registers 60 that are often used for storing information not related to a specific thread being processed, such as global configuration parameters and global statistics counters. In one embodiment, core 44 comprises 16 global registers.

In addition to the internal registers, RISC 24 comprises several external memories and interfaces that are accessible via a load/store (LS) bus 64. For example, a random access memory (RAM) 68 can be used to store variables, interim results, etc. In some embodiments, the RAM may be also accessible to external devices, such as data mover 40, via a FIFO 72. RISC 24 may contain one or more such RAMs. In some embodiments, data can also be stored in and retrieved from a content-addressable memory (CAM) 76, commonly known as an "associative memory," connected to LS bus 64. Core 44 reads/writes data from/to CAM 76 via a FIFO 80. Core 44 can also exchange commands and indications with data mover 40 and/or context/queue manager 28 via a command interface 82 connected to bus 64 through a FIFO 84. Additionally or alternatively, LS bus 64 can also be used to connect miscellaneous devices to core 44. For example, in some embodiments, one or more real-time clocks (RTC) 88 are connected via a FIFO 92 to the LS bus. The RTC can be read and set by the core.

Handling Multiple Threads

As noted above, RISC 24 is particularly suitable for processing multiple software threads. Each thread is associated with a context comprising a set of variable values, which define the current processing status of the thread. In some embodiments, each context may comprise several hundred bytes of information.

Unlike some known RISC architectures in which the RISC core runs software that schedules the processing of the different threads, the architecture of RISC 24 described herein uses a hardware-implemented scheduler 100 for performing these tasks, as well as other management tasks described below. By using the hardware-implemented scheduler, the processing resources of core 44 are dedicated to processing the threads themselves, significantly reducing the core resources spent on scheduling and other management functions.

Scheduler 100 comprises a thread arbitrator 112, which determines a schedule of processing the threads by core 44. The schedule comprises an order, or a sequence of threads to be served to core 44 for processing. Arbitrator 112 maintains a list of threads that are currently being handled by RISC 24. The thread list may in general comprise new threads as well as threads whose processing is already in progress.

During the operation of system 20, a new thread may be received from manager 28 or data mover 40 over a fast input channel (FIC) interface 104. RISC 24 may comprise one or more FIC interfaces connected to context/queue manager 28, to data mover 40 and/or to any other suitable external component. The contexts of threads whose processing is in progress are stored by arbitrator 112 in a context cache memory 108. Context cache 108 is located on-chip, internally to RISC 24. In addition to the state variables of the thread, the context typically comprises a program address in PRAM 48 from which the thread is to continue running, as well as other parameters. In some embodiments, context cache 108 is dimensioned to hold between 8 and 32 threads, although any other suitable memory size can be used.

In some embodiments, data pertaining to the threads being processed may be stored externally to RISC 24 in an external memory, such as in on-chip memory 32 and/or off-chip memory 36 described above. For simplicity of the description that follows, references to writing or reading data to or from context cache 108 by scheduler 100 should be understood to include exchanging the data not only with context cache 108, but also with on-chip memory 32 or off-chip memory 36 when required, depending on the location of the data in question. In some embodiments, scheduler 100 always exchanges data with context cache 108, regardless of the actual location of the data. In these embodiments, context cache 108 comprises suitable hardware for sending and receiving data that is not stored locally to and from the on-chip and off-chip memories, as appropriate. After the externally-stored data is retrieved, it typically becomes part of the relevant thread context.

In some embodiments, arbitrator 112 supports a predefined maximum number of threads simultaneously, such as 32 threads. Typically, but not necessarily, the size of context cache 108 corresponds to the maximum number of simultaneous threads. At any given time, a single thread that is currently being processed by core 44 is referred to as the active thread. The other threads are referred to as sleeping threads. During the processing of the active thread by core 44, arbitrator 112 selects and awakens the next thread to be processed. The next thread can be selected from a number of sources, including the FIC interface(s) and the context cache. In some embodiments, each sleeping thread in context cache 108 is assigned a priority level, with each priority level being handled as a separate source. For example, assuming RISC 24 comprises two FIC interfaces and that three priority levels are assigned to the sleeping threads, the arbitrator selects the next thread out of a total of five sources.

Arbitrator 112 arbitrates between the different sources to select the next thread to be processed by core 44, using any suitable arbitration method. In some embodiments, several arbitration schemes are predefined, each scheme defining a different order of priorities among the thread sources. For example, the following table shows five arbitration schemes denoted AS0, . . . , AS4 used to arbitrate between five different sources (e.g., two FICs and three priority levels of sleeping threads). The numbers 0-4 in the table correspond to the five sources:

|     | Highest priority | Second highest priority | Third highest priority | Fourth highest priority | Lowest priority |
| --- | --- | --- | --- | --- | --- |
| AS0 | 0 | 1 | 2 | 3 | 4 |
| AS1 | 1 | 0 | 2 | 3 | 4 |
| AS2 | 2 | 0 | 1 | 3 | 4 |
| AS3 | 3 | 0 | 1 | 2 | 4 |
| AS4 | 4 | 0 | 1 | 2 | 3 |

At runtime, the arbitrator alternates between the different arbitration schemes AS0, . . . , AS4 in accordance with a cyclic time frame comprising several time slots, typically between 1 and 20 slots. Within each source, threads are typically selected on a first-come-first-served basis.

At any given time, a particular thread may not be ready for processing, for example because it is waiting for data from an external source (such as from off-chip memory 36). Attempting to process a non-ready thread by core 44 would cause the core to be idle, as it waits for the externally-stored data to arrive. In some cases the idle time is many cycles long, since data may be fetched from off-chip memory 36, which may reside across a PCI bus in the memory of the host computer.

In order to avoid such idle periods in core 44, in some embodiments, scheduler 100 performs arbitration only among the threads that are ready for processing. Processing of threads that are waiting for external information is deferred until they are marked as ready. In some embodiments, RISC 24 comprises discrete thread ready inputs 140. The thread ready inputs can be driven, for example, by the data mover, responsively to a direct memory access (DMA) completion indication from a bus interface (not shown). Context/queue manager 28 indicates to arbitrator 112 using these inputs which of the threads is ready for processing. Selecting only threads that are ready for processing is particularly useful in I/O-intensive applications, i.e., applications comprising threads that frequently use information stored externally to RISC 24.

Externally-stored information can be written either to RAM 68, or to context cache 108, from which it is transferred by scheduler 100 to core 44. Thus, it is possible for a certain thread to request that externally-stored information be written into the core registers without losing processing cycles for loading data from memory. Typically, the requesting thread sleeps during this data retrieval, while core 44 is busy handling another thread.

Scheduler 100 also comprises a data manager 136, which transfers data between scheduler 100, core 44 and external components (such as context/queue manager 28 and data mover 40). After arbitrator 112 selects the next thread to be processed, data manager 136 transfers the context of this thread to core 44 over a direct register access (DRA) bus 116, typically via FIFOs 120. Data manager 136 reads the context either from the FIC interface or from context cache 108, as instructed by the arbitrator, and sends it to core 44. When core 44 completes or suspends the processing of a thread, data manager 136 reads the updated context of this thread from the core over DRA bus 116, and writes it over a fast output channel (FOC) interface 106 to context/queue manager 28. In general, RISC 24 may comprise one or more FOC interfaces connected to context/queue manager 28, to data mover 40 and/or to any other suitable external component.

In some embodiments, scheduler 100 assigns thread numbers that identify the threads. For this purpose, the scheduler maintains a list of available (currently unused) thread numbers. Initially, the list comprises numbers from 1 up to the maximum number of simultaneous threads. During operation, scheduler 100 assigns a number out of this list to every new thread received over the FIC interface. When a thread terminates, the core indicates this fact to the scheduler using a FIN interface 122. The scheduler frees the thread number of this thread and returns it to the list. The same thread number can later be re-assigned to a new thread.

Scheduler 100 also comprises a thread address generator 124, which determines the program address in PRAM 48 from which the next thread is to run. When the next thread is a new thread received over the FIC interface, its context comprises an "event ID" field. Generator 124 typically holds a table, addressable by the event ID value, which outputs the PRAM address to be used. When the next thread context is stored in context cache 108, this context includes the PRAM address from which the processing of the thread is to continue. In both cases, thread address generator 124 determines the appropriate PRAM address and provides it to core 44 over an INT interface 128, typically via a FIFO 132.

In some embodiments, scheduler 100 can also send serial data to external components using a serializer (parallel-to-serial converter) 144. In some embodiments, RISC 24 also comprises a set of general-purpose status/control registers 148, whose contents can be read and/or modified by external hardware.

In some embodiments, RISC 24 is used to perform protocol processing functions associated with connection-oriented communication protocols. In such embodiments, each thread processed by RISC 24 corresponds to a certain connection of the protocol. In general, the correspondence is not one-to-one, i.e., two or more threads may correspond to a certain connection. Each connection is defined by a connection context (which is not to be confused with the thread contexts described above). Connection contexts may be cached on-chip or stored in off-chip memory 36, such as in the memory of the host computer. For example, a particular application may have 256 connection contexts and 8, 16 or 32 cached thread contexts.

A newly-invoked thread handles a particular connection. Once a thread is invoked, if it goes to sleep (for example because it is waiting for externally-stored data to be fetched from the host memory), its thread context is stored on-chip in context cache 108. Typically, a new thread cannot be invoked if there are no thread resources available (e.g. if the new thread exceeds the maximum number of simultaneous threads). In some cases, RISC 24 may also handle global invocations not related to a specific connection. Global invocations may comprise, for example, flow control messages which need to be processed promptly. Typically, global invocations are not "sent to sleep" by scheduler 100 and are thus not included in the maximum number of simultaneous threads.

Alternating Core Register Sets

In order to increase the processing throughput of core 44, and specifically to reduce any idle time of the core due to context switching between threads, scheduler 100 uses the register sets 56. At any given time, one of the two register sets is referred to as the active register set, while the other set is referred to as the passive register set. The active register set holds the context of the active thread, and core 44 uses the data in the active register set when processing this thread. In parallel, arbitrator 112 selects the next thread to be processed, and data manager 136 loads its context into the passive register set. When core 44 completes or suspends the processing of the currently-active thread, the context of the next thread is already available in the passive register set, and no additional time is wasted on context switching. Thus, the dual register set configuration significantly improves the processing efficiency of core 44. A typical flow of this process is described in greater detail below.

Figure 3:
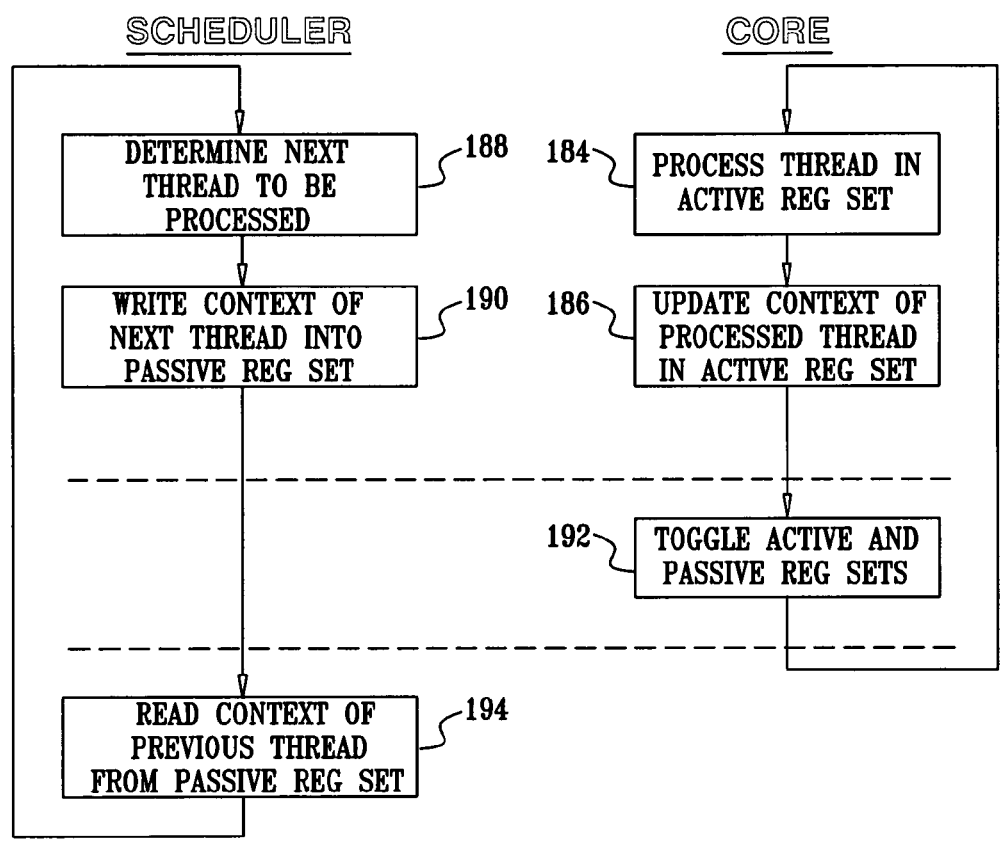
FIG. 3 is a flow chart that illustrates an exemplary method for processing multiple threads, in accordance with an embodiment of the present invention.

FIG. 3 is a flow chart that illustrates an exemplary method for processing multiple threads, in accordance with an embodiment of the present invention. The method is carried out by the scheduler 100 and the core 44 of RISC 24. The method begins with core 44 processing a currently-active software thread, at a thread processing step 184. The core uses a context of the active thread that is stored in one of register sets 56, presently serving as the active register set. During or after processing the thread, core 44 writes the updated context of the active thread into the active register set, at an active context updating step 186.

In parallel to steps 184 and 186 of core 44, arbitrator 112 in scheduler 100 determines the next thread to be processed, at a next thread selection step 188. The arbitrator performs this task at the same time as RISC core 44 is busy processing the currently-active thread. In other words, unlike software-based schedulers, which use CPU resources in determining which thread to process next, thread selection in RISC 24 is performed in hardware by the scheduler, without using any resources of the RISC core. Arbitrator 112 can apply any suitable method for selecting the next thread, such as the arbitration methods described hereinabove. Data manager 136 in scheduler 100 now fetches the context of the next thread selected at step 188 above from either the FIC interface or from the context cache, and loads it into the register set serving as the passive register set, at a next context loading step 190.

When core 44 is ready to process the next thread, and provided that data manager 136 completed the loading of the context of the next thread into the passive register set, core 44 switches the roles of the active and passive register sets, at a toggling step 192. In other words, the previously-active register set becomes the passive register set and vice versa. Step 192 typically comprises changing the roles given to the register sets, and does not involve actual moving or copying of data. As a result, the active register set now contains the context of the next thread to be processed, which is now to become the active thread. Core 44 loops back to step 184 to process the new active thread, whose context is now present in the active register set.

After core 44 toggles between the active and passive register sets, data manager 136 reads the context of the previously-processed thread from the passive register set and sends it either to context cache 108 or over FOC 106, at a previous context reading step 194. The instruction as to the destination of the thread (context cache or FOC) is typically specified in the thread itself. Scheduler 100 loops back to step 188 to determine the next thread to be processed.

In some scenarios, the next thread to be awakened is the same thread as the last thread processed. In such a scenario, there is typically no need to fetch the context of the next thread from context cache 108, since it is already present in the core's internal registers. In some embodiments, a "shortcut" mechanism is implemented by scheduler 100 in order to reduce unnecessary data transfer from context cache 108 to the passive register set. Scheduler 100 checks whether the next thread is the same as the previous thread and if so, omits next context loading step 190.

Solving Decision Problems Using Decision Tree Traversal

Many computing applications involve frequent handling of complex decision problems. In a decision problem, the computer chooses which task to perform based on the values of or the relationship between one or more variables. A typical decision problem is the evaluation of a state transition condition in a state machine model. As an exemplary application, the status of a connection in a connection-oriented protocol is often represented as a state machine, in which transition conditions determine transitions from one state to another.

In some known computers and microprocessors, a decision problem such as a state transition condition is broken down into a sequence of IF . . . THEN . . . ELSE commands, such as:

IF cond1 THEN jump1 ELSE
IF cond2 THEN jump2 ELSE
IF cond3 THEN jump3 ELSE
IF cond4 THEN jump4 wherein cond1, . . . , cond4 are four state transition conditions and jump1, . . . , jump4 are branching instructions that instruct the processor to jump to a program address containing the code to be carried out when the corresponding condition is met.

When the processor or computer performing the state transition evaluation has a pipelined architecture, such sequences of conditional branch instructions are costly in terms of computational efficiency, especially when the condition evaluates to FALSE and the branch is not taken. In these cases, several pipeline stages are typically flushed and not used. This effect is referred to as "breaking the pipeline." For applications rich in decision problems, such as connection-oriented protocol processing, it is desirable to minimize events that break the pipeline in order to increase the computational efficiency of the processor. For example, some of the transition conditions in the state machine of TCP comprise several tens and up to several hundreds of decisions. Sequential processing of these conditions using IF . . . THEN . . . ELSE commands would result in a very high rate of pipeline flushing. One method for avoiding pipeline inefficiencies is described in U.S. Patent Application Publication 2003/0135721 A1, The pipeline flushing effect can be appreciated by referring to FIG. 4.

FIG. 4 is a block diagram that illustrates exemplary pipeline stages of pipeline 54 in core 44 of RISC 24, in accordance with an embodiment of the present invention. Pipeline 54 comprises five cascaded stages. Each instruction in the instruction set of RISC 24 is broken down into several sequential basic operations, as described above. In each clock cycle, each stage of pipeline 54 performs one of the basic operations, and then shifts the contents of the pipeline. Instructions are fed sequentially into the pipeline, so that when some stages process basic operations belonging to a certain instruction, other stages may already be processing basic operations of the next instruction.

In a typical pipeline flow, an instruction fetching stage 164 fetches the instruction from the appropriate address in PRAM 68. An operand fetching stage 168 decodes the instruction and fetches the operands specified by the instruction from register set 56 and/or registers 60. A byte alignment stage 172 performs bitwise shift operations, as necessary to align the operands before performing the logical/arithmetic operation specified in the instruction. An ALU operation stage 176 performs, using ALUs 52, the logical/arithmetic operation specified in the instruction. A writeback stage 180 writes the result of the operation into the specified destination address. A data address generator 160 generates the address the result should be written back into, which may be an address of an internal register in core 44 or an address in RAM 68.

Now consider that the pipeline described above processes a sequence of conditional branch instructions. For each instruction, the pipeline stages fetch the necessary registers, evaluate the branch condition, etc. If the branch is not taken, the entire pipeline has to be flushed since it contains a branch operation that should not be performed. Repetitive pipeline flushing results in many wasted clock cycles.

An alternative method of representing a decision problem is using a decision tree, in which nodes represent Boolean conditions and leaves represent the code to be run (or, more often, a branch to the program address of this code). In particular, a decision tree can represent a complex Boolean expression or a state transition condition in a state machine model. In general, however, a decision tree can represent a decision problem that is more general than a single Boolean expression. For example, as shown in detail in FIG. 5 below, a decision tree can be used to perform certain tasks based on the size relationship among a set of registers.

Figure 5:
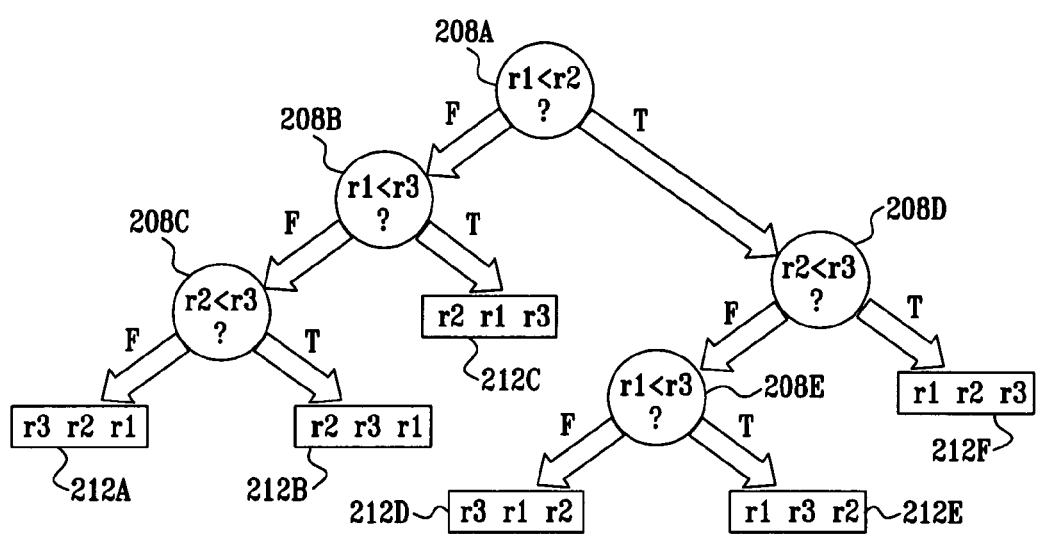
FIG. 5 is a diagram that illustrates an exemplary decision tree, in accordance with an embodiment of the present invention.

FIG. 5 is a diagram that illustrates an exemplary decision tree, in accordance with an embodiment of the present invention. The decision problem represented by this exemplary decision tree is the following: Three registers denoted r1, r2 and r3 are provided. A task to be performed is to be selected out of six alternative tasks, based on the size relationship between the three registers. In other words, perform a certain task if r1<r2<r3, perform another task if r3<r1<r2, etc.

The decision problem can be solved by traversing the decision tree. Each of nodes 208A-208E of the tree comprises a comparison operation between at least two of the registers. Based on the comparison (which may evaluate to TRUE or to FALSE), a path is found through the decision tree, leading to one of leaves 212A-212F. Each leaf 212 corresponds to one of the six alternative tasks. Typically, each leaf corresponds to a branch operation, and the leaf actually contains a program address in PRAM 48 from which the chosen code begins.

With regard to pipelined instructions, solving a decision problem using tree traversal is inherently more efficient than a sequence of conditional branch instructions, because the pipeline is flushed only once, when performing the unconditional branch specified by the appropriate leaf. Tree traversal comprises evaluation of conditions, but does not include any conditional branches that may or may not be taken.

As will be shown below, in order to minimize pipeline flushing due to branch operations, the instruction set of core 44 in RISC 24 comprises instructions that are particularly efficient in solving decision problems using decision tree traversal. In particular, when core 44 comprises a plurality of ALUs 52, these instructions make efficient use of the core architecture by performing, for example, two or more parallel computations in each evaluation step using the ALUs.

Figure 6:
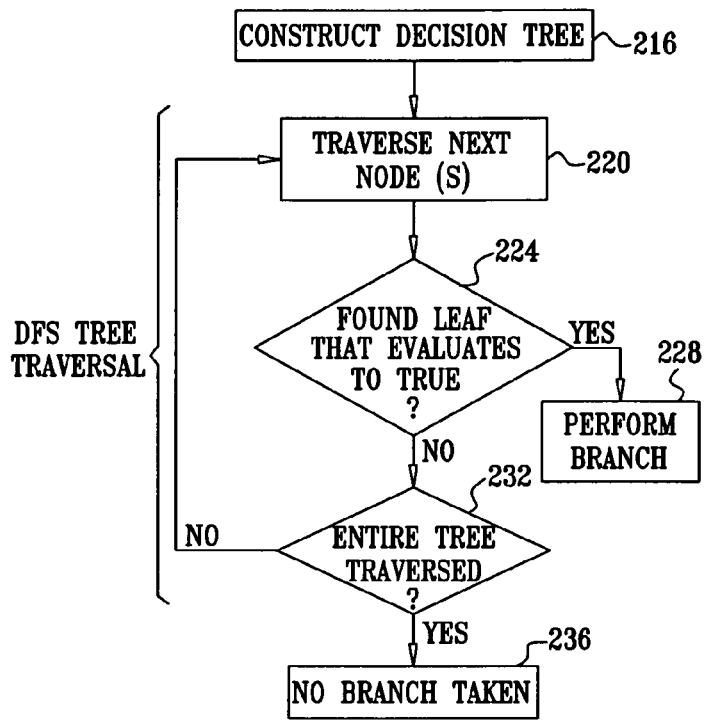
FIG. 6 is a flow chart that illustrates an exemplary method, carried out by a core, for solving decision problems using decision tree traversal, in accordance with an embodiment of the present invention.

FIG. 6 is a flow chart that illustrates an exemplary method, carried out by core 44, for solving decision problems using decision tree traversal, in accordance with an embodiment of the present invention. The method begins with construction of a decision tree representing the decision problem, at a tree representation step 216. The step may be carried out manually, by a programmer, or automatically, by a computer, for example as part of the compilation of the program into code. The decision problem is analyzed to produce a decision tree structure, in which leaves represent the alternative branch operations. The resulting decision tree is used by core 44 at runtime, in accordance with steps 220-236 below.

At runtime, when RISC 24 processes the decision problem, core 44 traverses the decision tree in order to determine the desired branch operation. In some embodiments, the tree is traversed in a depth first search (DFS) order, although other traversal strategies can also be used.

The core 44 traverses one or two nodes of the decision tree, at a traversal step 220. In various exemplary embodiments of the invention, in which core 44 comprises two ALUs 52, two nodes can be evaluated in parallel, one using each ALU. Otherwise, a single node is evaluated at each step. (In other embodiments, in which core 44 comprises more than two ALUs, a higher number of nodes can be evaluated in parallel.) The core 44 checks whether a leaf that evaluates to TRUE was found, at an evaluation checking step 224. A leaf evaluates to TRUE if there is a path of decisions that evaluate to TRUE that lead to it. If such a leaf is found, the core concludes that a branch to the address specified by the leaf is desired. The core performs the branch, at a branching step 228. Core 44 typically branches to the program address specified by the leaf (i.e., flushes pipeline 54, moves the program counter to the appropriate address and loads the pipeline with instructions fetched from this address).

If no leaf that evaluates to TRUE was found at this stage, core 44 checks whether the entire tree has been traversed, at a completion checking step 232. If there are remaining nodes to be traversed, the method returns to step 220 to traverse and evaluate the remaining nodes of the decision tree. Typically, decision trees are designed so that there is always a leaf that evaluates to TRUE. Thus, traversing the entire tree without finding a leaf that evaluates to TRUE corresponds to an error condition, at an error step 236.

In some cases, however, it is desirable to implement a "fall-through" mode, in which the program code continues to run from the present address without performing any branch operation. For this purpose, in some embodiments, one of the leaves may contain a "fall-through" indication rather than a branch instruction.

Unlike some known methods in which the program addresses of the different branching operations must have even or uniform offsets from one another, it is apparent from the description above that there is no limitation on the selection of program addresses when using the method of FIG. 6.

In many cases, a decision problem can be translated into several decision tree structures. In some embodiments, the construction of the decision tree takes into account the occurrence probability of each branch. In particular, the decision tree can be constructed so that the most frequently-occurring branch is the first leaf to be traversed. Such a tree structure is particularly useful in situations in which a vast majority of tree traversals end up at a particular branch. For example, the decision tree may represent validity checking of an arriving communication packet. Since the vast majority of arriving packets are typically valid, the average computation time per packet can generally be minimized by arranging the tree so that the "valid" branch is the first one to be traversed. The remaining branches represent various errors in the packet that have relatively small occurrence probabilities. Using this method, the average traversal time can be significantly reduced.

In some embodiments, the instruction set of core 44 comprises an instruction denoted wcd for performing logic operations on a pair of operands in a manner that is particularly suitable for implementing the DFS tree traversal method described above. Typically, the decision tree is translated into a sequence of wcd commands, with each wcd command evaluating a single node of the decision tree. The wcd commands are ordered so as to traverse the tree in a DFS order. (An example demonstrating the translation of the decision tree of FIG. 5 above into a sequence of wcd commands is given below.)

For each node, the corresponding wcd command examines the node and its two children (each of which may be a leaf or another node). The configuration of the evaluated node is specified by the programmer by referring to one of three alternative leaf diagrams.

Figure 7A:
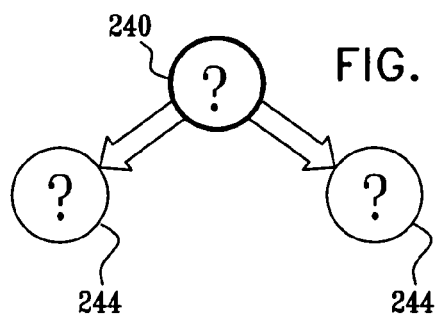
FIGS. 7A-7C are diagrams that illustrate exemplary leaf configurations in a decision tree, in accordance with an embodiment of the present invention.
Figure 7B:
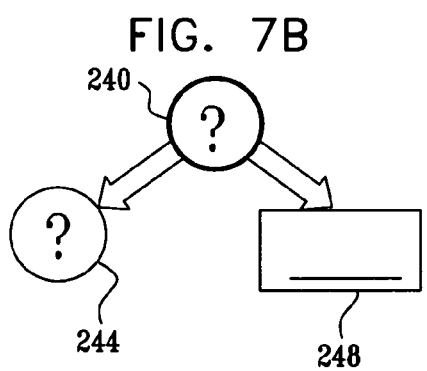
Figure 7C:
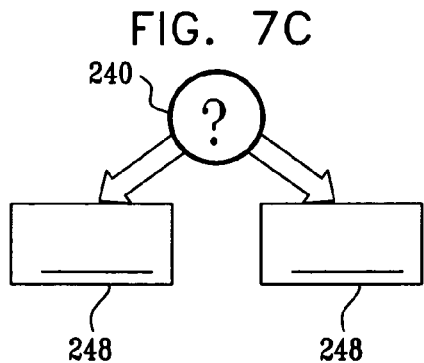

FIGS. 7A-7C are diagrams that schematically illustrate the three leaf configurations of the wcd command, in accordance with an embodiment of the present invention. FIG. 7A shows an evaluated node 240 having two child nodes 244, in accordance with an embodiment of the invention. FIG. 7B shows another evaluated node 240 having one child node 244 and one child leaf 248, in accordance with an embodiment of the invention. FIG. 7C shows yet another evaluated node 240 having two child leaves 248, in accordance with an embodiment of the invention.

Each wcd command can perform a basic comparison operation (e.g. less than, greater than, equal to, etc.) between its two operands, or a more complex expression that involves popping one or two values from a stack (not shown) that were previously pushed into the stack by a previous instruction. The following table gives the alternative expression types that can be evaluated. In the table, r denotes the result of the previous instruction, p1 denotes a first pop from the stack and p2 denotes a second pop from the stack.

| Expression index (expr) | Expression |
|---|---|
| 0 | r |
| 1 | r AND p1 |
| 2 | r OR p1 |
| 3 | r AND p1 AND p2 |
| 4 | r OR p1 OR p2 |
| 5 | (r AND p1) OR p2 |
| 6 | (r OR p1) AND p2 |
| 7 | r XOR p1 |
| 8 | NOT r |
| 9 | NOT (r AND p1) |
| 10 | NOT (r OR p1) |
| 11 | NOT (r AND p1 AND p2) |
| 12 | NOT (r OR p1 OR p2) |
| 13 | NOT ((r AND p1) OR p2) |
| 14 | NOT ((r OR p1) AND p2) |
| 15 | NOT (r XOR p1) |

The syntax of the wcd command is:
"wcd(Lid)(expr) Src1 (cc) Src2, False_label, True_label"
wherein Lid denotes an index to the appropriate leaf diagram. Lid has values a, b and c, corresponding to the diagrams of FIGS. 7A, 7B and 7C, respectively. expr denotes an index to the expression type table above. False_label and True_label are branch offset addresses indicating the desired branch if the evaluated condition is FALSE or TRUE, respectively. Src1 and Src2 denote the two registers containing the values to be compared. In some embodiments, the comparison can be performed on only a subset of the bits of src1 and src2. For example, the notation r1!m indicates that the entire register r1 should be compared. The notation r1!b0 indicates that the comparison should include only the eight least significant bits of register r1. cc denotes a comparison operator such as lt (less than), gt (greater than), le (less than or equal), eq (equal), etc.

The following exemplary code implements a DFS traversal of the decision tree shown in FIG. 5 above:

wcda0 r1!m lt r2!m, 0, 0
    wcdb0 r1!mm lt r3!m, 0, _r2r1r3
    wcdc0 r2!m lt r3!m, _r3r2r1, _r2r3r1
    wcdb0 r2!m lt r3!m, 0, _r1r2r3
    wcdc0 r1!m lt r3!m, _r3r1r2, _r1r3r2

In some embodiments, when core 44 comprises two ALUs 52, the instruction set of RISC 24 comprises an instruction denoted cmpdfs. cmpdfs is an extension of the wcd command given above to the case of two ALUs. cmpdfs evaluates two nodes of the decision tree (i.e., performs two comparison operations) in a single command, one node using each ALU 52. As cmpdfs examines two nodes simultaneously, there are nine possible leaf diagrams. The leaf diagrams account for the different configurations of evaluated nodes 240, child nodes 244 and child leaves 248. (In embodiments in which core 44 comprises more than two ALUs, Similar instructions can be defined, mutatis mutandis, for evaluating a higher number of nodes in parallel.)

FIGS. 8A-8I are diagrams that schematically illustrate a plurality of exemplary leaf configurations of the cmpdfs command, in accordance with an embodiment of the present invention. In the syntax of this command, the Lid parameter can take the values a, . . . , i, corresponding to the leaf diagrams in FIGS. 8A-8I, respectively.

Indirect Addressing of Registers

In some embodiments, the instruction set of core 44 comprises commands that address registers indirectly. In other words, in writing program code for RISC 24, the programmer need not directly specify the actual numbers of the registers to be used in each command, but may instead specify the use of a register whose number is given dynamically by another register. For example, an instruction denoted movrind copies a source register to a destination register, with one or both of these registers given indirectly. The registers used are located in register set 56 presently serving as the active register set. The index of the indirectly-addressed register is taken at runtime from a particular byte within another register specified in the command. This feature is useful, for example, in composing packet header fields, in which different segments of the context may be updated at different stages: Indirect addressing permits the different updates to be handled by the same set of program commands, rather than different commands referring to different sets of registers.

For example, the command movrind IndD<i/d>, Src copies the register Src (given explicitly) to a destination register specified in IndD. IndD is an address of a particular byte within one of the other registers in the active register set, typically expresses as a register index and an offset within this register. The contents of IndD define the index of the destination register into which register Src is to be copied. <i/d> is an optional field specifying that the contents of IndD are to be incremented or decremented after performing the movrind command. The <i/d> field is particularly useful for performing loops comprising multiple movrind commands over a range of registers.

Similarly, the command movrind Dest, IndS<i/d> copies the register specified indirectly in IndS to register Dest. <i/d> here applies to IndS. The movrind command can also address both source and destination registers indirectly: The command movrind IndD<i/d>, IndS<i/d> copies the register specified in IndS to the register specified in indD.

FIG. 9 is a diagram that demonstrates exemplary use of the movrind command for indirect addressing of registers, in accordance with an embodiment of the present invention. FIG. 9 demonstrates the command movrind IndD, IndS, in which both the source and destination registers are indexed indirectly. Active register set 56 is shown as comprising registers 250. A register denoted IndS contains the value REG_S. REG_S is the index of the register holding the value to be copied into the destination register. Thus, when performing this movrind command, core 44 fetches the contents of register IndS and uses this value (REG_S) as an index. The core then fetches the contents of register REG_S (DATA_S). DATA_S is the value to be written into the destination register.

To determine the destination register, core 44 fetches the contents of register IndD (REG_D) and uses this value as an index. The core then writes DATA_S into the register REG_D.

In some embodiments, the execution of the movrind command is conditional, depending on the status of one or more flags 45 of core 44. The core 44 comprises several flags 45 indicating, for example, a carry, an overflow, a negative result or a zero result of a previous calculation. For this purpose, an optional <cc> (condition code) field is added to the command, indicating the desired condition. Using the <cc> field, a movrind operation may be executed only if the preceding calculation performed by core 44 caused a certain combination of values of the flags 45.

In an embodiment of the invention, aspects of a reduced instruction set computer (RISC) processor may comprise one or more arithmetic logic units (ALUs), which evaluate logical conditions. The RISC processor may also comprise a processing pipeline that may be adapted to solve a decision problem that may represent a decision tree comprising at least three nodes. In this regard, the RISC processor may be adapted to process a sequence of pipelined instructions that traverse the decision tree. At least some of the pipelined instructions may instruct the one or more ALUs to evaluate respective logical conditions. The instructions from the pipeline may be flushed no more than once in the course of processing the sequence regardless of whether the logical conditions evaluate to true or false.

The at least one ALUs may comprise two or more ALUs. In this regard, each of the pipelined instructions instructs at least two ALUs to evaluate in parallel respective two or more logical conditions corresponding to respective two or more nodes of the decision tree.

The RISC processor may also comprise a program memory that may be adapted to hold software code executed by the pipeline. Solutions of the decision problem may correspond to branch instructions that instruct the pipeline to execute the code stored at respective program addresses in the program memory. In response to one of the solutions of the decision problem, the pipeline may continue to execute the code from a present location in the program memory without performing a branch instruction.

In another embodiment of the invention, aspects of a RISC processor may comprise a register set comprising registers having respective indices. The RISC processor may comprise a processing core that may be adapted to accept an instruction that performs an operation on an operand held in a first register, which may be identified by an index held in a second register that may be specified by the instruction, and which may be further arranged, in response to the instruction, to extract the index of the first register from the second register and to perform the operation on the operand in the first register as identified by the extracted index. The instruction may comprise a flag corresponding to the operand and may instruct the core to perform one of incrementing and decrementing the index after performing the operation.

In another embodiment of the invention, aspects of a method for solving a decision problem using a RISC processor may comprise translating the decision problem into a decision tree comprising at least three nodes. The RISC processor may comprise a processing pipeline, for example. The method may comprise programming the RISC processor with a sequence of pipelined instructions which when executed by the RISC processor traverses the decision tree. At least some of the pipelined instructions may evaluate logical conditions, such that the pipeline flushes the instructions from the pipeline no more than once in the course of processing the sequence regardless of whether the logical conditions evaluate to true or false. The method may also comprise processing the sequence in the processing pipeline so as to solve the decision problem.

The RISC processor may comprise two or more arithmetic logic units (ALUs). The processing the sequence may comprise, for at least some of the pipelined instructions, evaluating in parallel using the at least two ALUs two or more logical conditions corresponding respectively to at least two nodes of the decision tree. The programming of the RISC processor may comprise storing software code executed by the pipeline in a program memory. In this regard, the processing the sequence may comprise executing a branch instruction that instructs the pipeline to execute the code stored at respective program addresses in the program memory responsively to a solution of the decision problem. Moreover, the processing the sequence may comprise, in response to one of the solutions of the decision problem, continuing to execute the code from a present location in the program memory without performing a branch instruction.

In another embodiment of the invention, aspects of a method for performing an operation in a RISC processor may comprise providing a register set comprising registers having respective indices. The method may comprise accepting an instruction for performing an operation on an operand held in a first register, which is identified by an index held in a second register that is specified by the instruction. In response to the instruction, the method may comprise extracting the index of the first register from the second register to perform the operation on the operand in the first register as identified by the extracted index. The instruction may comprise an increment/decrement flag corresponding to the operand. Performing the instruction may comprise performing one of incrementing and decrementing the index after performing the operation responsively to the flag.

Another embodiment of the invention may provide a machine-readable storage having stored thereon, a computer program having at least one code section for communicating information in a network, the at least one code section being executable by a machine for causing the machine to perform steps as disclosed herein.

Although the embodiments described above relate specifically to features of RISC 24, the principles of these embodiments are generally not dependent on the specific architecture of this RISC and may similarly be applied in computing devices of other types.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A reduced instruction set computer (RISC) processor, comprising:
    a register set comprising registers having respective indices;
    a processing core, which accepts one or more instruction for performing an operation on an operand held in a first register, which is identified by an index held in a second register that is specified by the one or more instruction, and which is further arranged, responsively to the one or more instruction, to extract the index of the first register from the second register and to perform the operation on the operand in the first register as identified by the extracted index.

2. A method for performing an operation in a reduced instruction set computer (RISC) processor, the method comprising:
    providing a register set comprising registers having respective indices;
    accepting one or more instruction for performing an operation on an operand held in a first register, which is identified by an index held in a second register that is specified by the one or more instruction;
    responsively to the one or more instruction, extracting the index of the first register from the second register; and
    performing the operation on the operand in the first register as identified by the extracted index.

3. The RISC processor according to claim 1, wherein the instruction comprises a flag corresponding to the operand and instructing the core to perform one of incrementing and decrementing the index after performing the operation.

4. The method according to claim 2, wherein the instruction comprises an increment/decrement flag corresponding to the operand, and wherein performing the instruction comprises performing one of incrementing and decrementing the index after performing the operation responsively to the flag.

5. The RISC processor according to claim 3, wherein said flag signals comprise one or more of a carry over, an overflow, a negative result and/or a zero result from a previous instruction.

6. The method according to claim 4, wherein said flag signals comprise one or more of a carry over, an overflow, a negative result and/or a zero result from a previous instruction.

* * * * *